United States Patent
Roder et al.

(10) Patent No.: US 10,683,011 B2
(45) Date of Patent: Jun. 16, 2020

(54) DYNAMIC VEHICLE DISPLAY FOR COMMUNICATING MULTIPLE VEHICLE PARAMETERS

(71) Applicant: Robert Bosch GmbH, Stuttgart (DE)

(72) Inventors: Jeffrey M. Roder, Walled Lake, MI (US); Marius Noller, Walheim (DE); Philip Ventimiglia, Dearborn Heights, MI (US); Svea Hillenbrand, Darmstadt (DE); Cornelius Dosch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 653 days.

(21) Appl. No.: 14/274,909

(22) Filed: May 12, 2014

(65) Prior Publication Data
US 2014/0336884 A1    Nov. 13, 2014

Related U.S. Application Data

(60) Provisional application No. 61/822,050, filed on May 10, 2013.

(51) Int. Cl.
| | |
|---|---|
| *B60K 35/00* | (2006.01) |
| *B60W 30/19* | (2012.01) |
| *B60K 37/02* | (2006.01) |
| *B60W 30/18* | (2012.01) |
| *F16H 63/42* | (2006.01) |

(52) U.S. Cl.
CPC ............ *B60W 30/19* (2013.01); *B60K 35/00* (2013.01); *B60K 37/02* (2013.01); *B60W 30/18* (2013.01); *F16H 63/42* (2013.01); *B60K 2370/155* (2019.05); *B60K 2370/167* (2019.05); *F16H 2063/426* (2013.01)

(58) Field of Classification Search
None
See application file for complete search history.

(56) References Cited

U.S. PATENT DOCUMENTS

| | | | |
|---|---|---|---|
| 4,716,458 A | 12/1987 | Heitzman et al. | |
| 4,908,767 A | 3/1990 | Scholl et al. | |
| 5,457,439 A * | 10/1995 | Kuhn | B60K 35/00 340/435 |
| 6,130,608 A | 10/2000 | McKeown et al. | |

(Continued)

FOREIGN PATENT DOCUMENTS

| | | |
|---|---|---|
| DE | 1034186 | 7/1958 |
| DE | 102009010810 | 9/2010 |

(Continued)

*Primary Examiner* — Amr A Awad
*Assistant Examiner* — Donna V Lui
(74) *Attorney, Agent, or Firm* — Michael Best & Friedrich LLP (57) ABSTRACT

Systems and methods are described for a graphical vehicle cluster display that conveys vehicle acceleration information. A controller is configured to receive a signal indicative of vehicle acceleration. A substantially circular icon is displayed on the screen when the signal indicates that the acceleration is approximately zero in a forward direction. A stretched elliptic icon is display on the screen when the acceleration of the vehicle in a forward direction is greater than zero. A compressed elliptic icon is displayed on the screen when the acceleration of the vehicle in the forward direction is less than zero.

10 Claims, 6 Drawing Sheets

(56) References Cited

U.S. PATENT DOCUMENTS

| | | | |
|---|---|---|---|
| 6,675,650 B1 * | 1/2004 | Paulo | B60K 35/00 324/115 |
| 7,324,878 B2 | 1/2008 | Imai et al. | |
| 8,004,424 B2 | 8/2011 | Matsuoka et al. | |
| 8,831,807 B2 | 9/2014 | Dehmann | |
| 9,177,427 B1 * | 11/2015 | Briggs | G07C 5/00 |
| 2001/0043465 A1 * | 11/2001 | Warner | B60T 8/171 361/785 |
| 2004/0145461 A1 * | 7/2004 | Sandberg | B60R 16/0232 340/439 |
| 2008/0218529 A1 * | 9/2008 | Okubo | A63F 13/10 345/619 |
| 2012/0179349 A1 * | 7/2012 | Yamakado | B60T 8/1755 701/89 |
| 2013/0027426 A1 * | 1/2013 | Sasaki | B60K 35/00 345/629 |
| 2013/0060467 A1 | 3/2013 | Nash | |
| 2013/0096895 A1 * | 4/2013 | Willard | B60K 37/02 703/8 |
| 2014/0018974 A1 * | 1/2014 | Okita | B60W 30/20 701/1 |

FOREIGN PATENT DOCUMENTS

| | | |
|---|---|---|
| DE | 102009041194 | 3/2011 |
| DE | 102010052304 | 5/2012 |
| DE | 102011102639 | 11/2012 |
| DE | 102012024949 | 6/2014 |
| EP | 2196961 | 6/2010 |
| EP | 2653349 | 10/2013 |
| GB | 2511173 | 8/2014 |
| WO | 2006029580 | 3/2006 |
| WO | 2012159650 | 11/2012 |
| WO | 2013038125 | 3/2013 |
| WO | 2013145582 | 10/2013 |

* cited by examiner

DYNAMIC VEHICLE DISPLAY FOR COMMUNICATING MULTIPLE VEHICLE PARAMETERS

RELATED APPLICATIONS

This application claims the benefit of U.S. Provisional Application No. 61/822,050, filed on May 10, 2013, the entire contents of which are incorporated herein by reference.

BACKGROUND

The present invention relates to vehicle display systems.

SUMMARY

In various embodiments, the invention provides systems and methods for improving communication of vehicle parameters to an operator of the vehicle. In particular, the systems provide a graphical indication of vehicle performance attributes such as, for example, engine speed (RPM), longitudinal acceleration, lateral acceleration, and shift-points. Based on this information, the operator of the vehicle can better control the vehicle.

In one embodiment, the invention provides a graphical display unit for a vehicle including a screen and a controller. The controller is configured to receive a signal indicative of vehicle acceleration. A substantially circular icon is displayed on the screen when the signal indicates that the acceleration is approximately zero in a forward direction. A stretched elliptic icon is display on the screen when the acceleration of the vehicle in a forward direction is greater than zero. A compressed elliptic icon is displayed on the screen when the acceleration of the vehicle in the forward direction is less than zero.

In some such embodiments, the primary access on which the icon is stretched or compressed is tilted to indicate lateral acceleration of the vehicle. The diameter of the circular icon is also increased or decreased based on a current engine speed of the vehicle and a numeric value indicative of the current engine speed is displayed on the circular icon. The color of the circular icon may also be changed during operation to indicate whether the vehicle is currently being operated in a recommended gear.

In another embodiment, the invention provides a graphical display unit for a vehicle including a screen and a controller. An acceleration map is displayed on the screen and a first signal is received that is indicative of a current linear acceleration and a current lateral acceleration. A first icon is displayed on the acceleration map at a first location. The horizontal position of the first icon is indicative of the current lateral acceleration and the vertical position is indicative of the current linear acceleration. A second signal indicative of a subsequent lateral and linear acceleration is received and the position of the first icon is changed based on the second signal. A second icon is displayed at the first location if the first location is further from a center point of the acceleration map than the second location. The second icon is indicative of a maximum detected acceleration of the vehicle.

In some embodiments, the invention provides a vehicle display system including a vehicle display and a display controller. The display controller causes the vehicle display to show a performance ball indicator representing acceleration forces acting on the vehicle. Longitudinal forces are illustrated by stretching the ball shape when longitudinal acceleration is detected and compressing the ball when longitudinal deceleration (i.e., braking) is detected. Lateral forces are illustrated by rotating the position of the ball on the display. The degree and direction of rotation correspond to the magnitude and direction of the detected lateral acceleration.

In other embodiments, the invention provides a vehicle display system including a vehicle display and a display controller. The display controller causes the vehicle display to show a radial grid to illustrate acceleration forces acting on the vehicle. A ball moves in two dimensions on the radial grid to illustrate both lateral and longitudinal accelerations. The ball moves one direction (e.g., backward) on the grid when longitudinal acceleration is detected and moves in the opposite direction (e.g., forward) on the grid with longitudinal deceleration (i.e., braking) is detected. The ball moves to the left when lateral acceleration is detected in a first direction and to the right when lateral acceleration is detected in the opposite direction.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
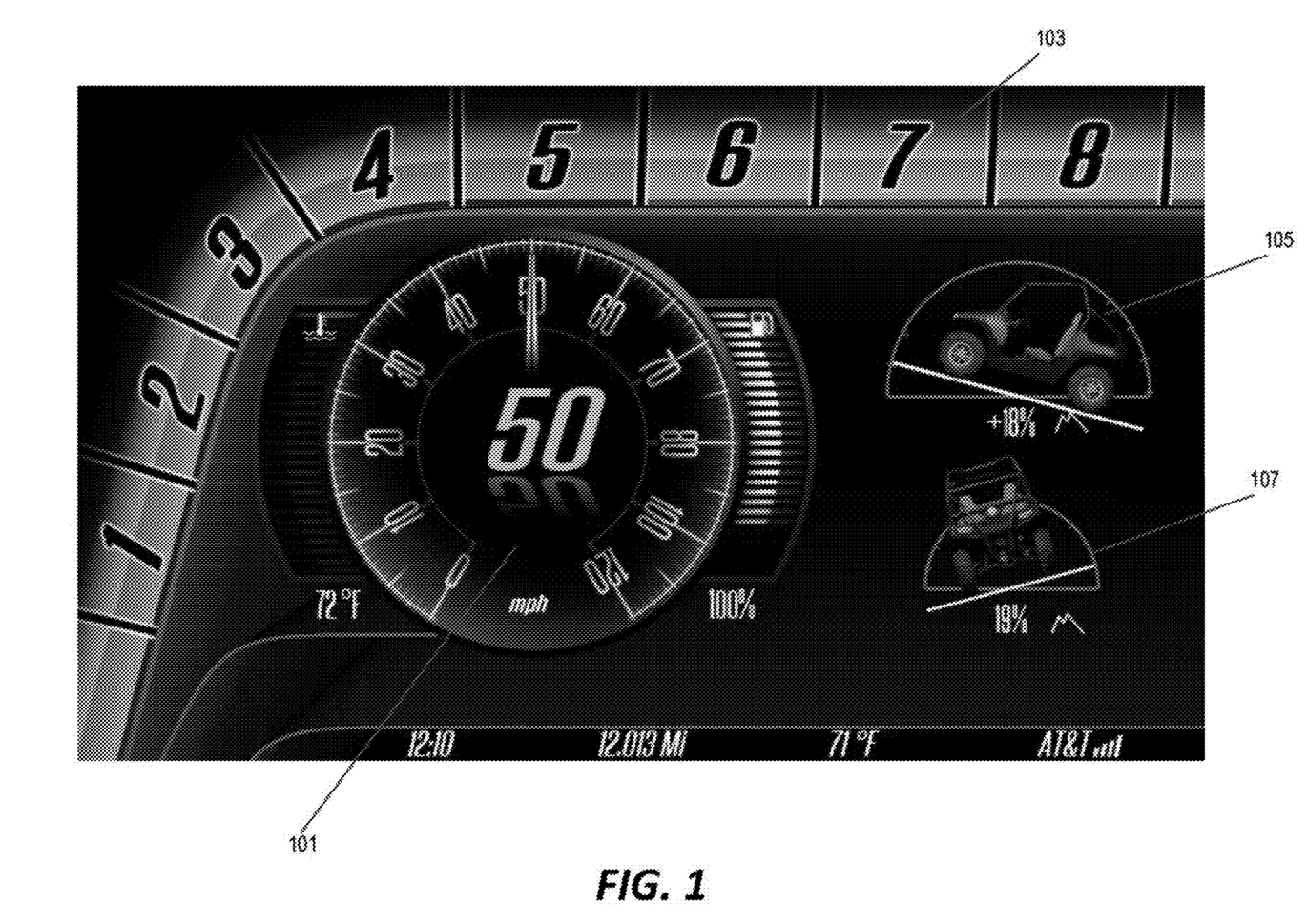
FIG. 1 is a front view of a vehicle display cluster according to one embodiment.

FIG. 1 illustrates a first construction of a dynamic vehicle display cluster. The display includes a speedometer component 101 that shows the speed of the vehicle in miles-per-hour, km-per-hour, or according to another applicable unit. To the left of the speedometer component is a temperature gauge and to the right is a fuel gauge. However, in other constructions, the gauges to the immediate left and right of the speedometer component 101 can be used to illustrate other information. A numeric scale indicator 103 is provided across the top of the display. In this example, the numeric scale indicator 103 includes integer numbers from one through eight and is used as a tachometer indicating engine speed on an ×100 scale. However, a similar numeric scale can be used in other constructions to indicate other engine performance characteristics.

The display also includes a longitudinal incline indicator 105 that displays the current inclination/declination of the vehicle as determined based on information from one or more vehicle sensors includes, for example, force sensors or gyroscopic incline sensors.

Figure 2:
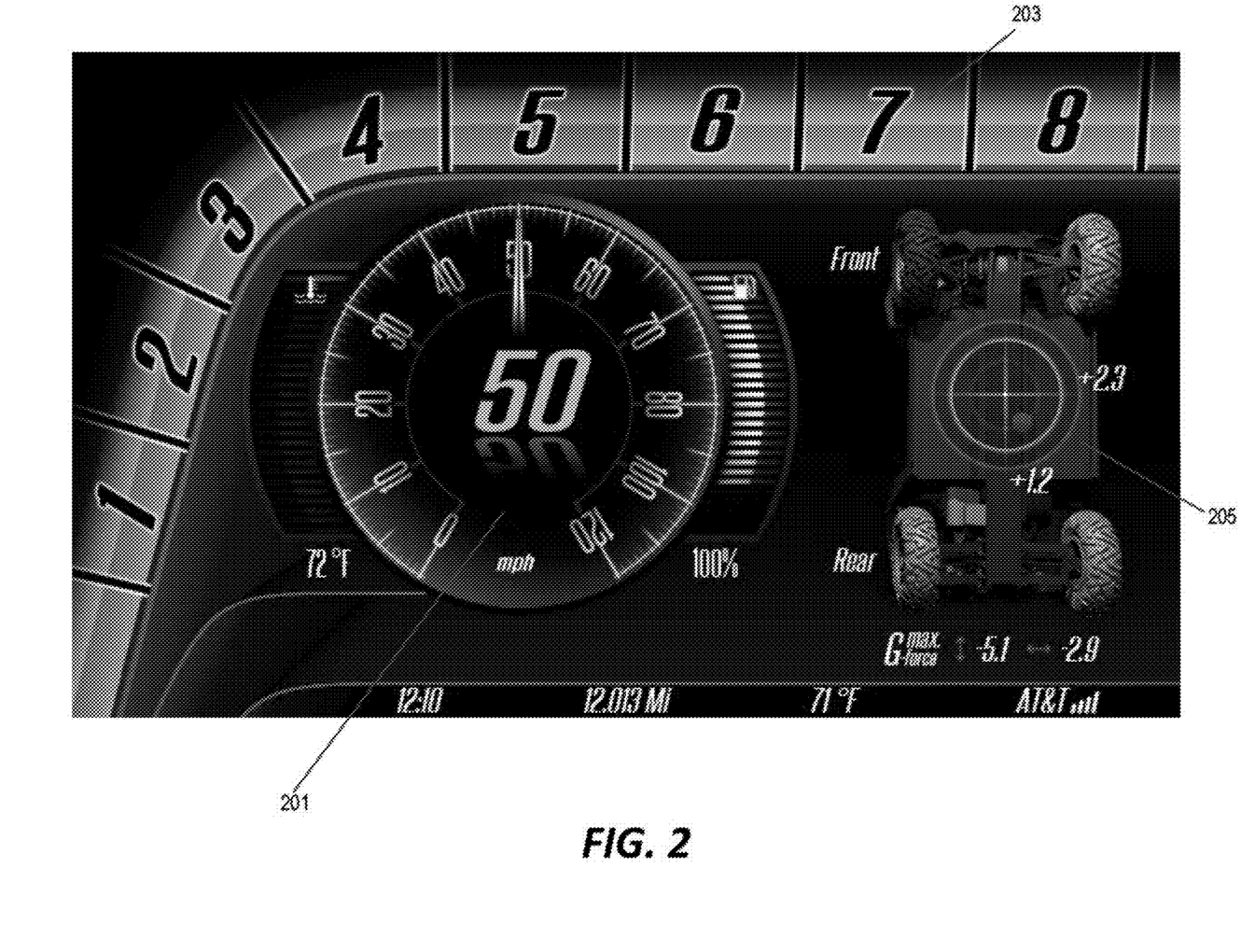
FIG. 2 is an alternate display of the vehicle display cluster of FIG. 1.

A user of the vehicle can change the display of FIG. 1 to show additional information in a different view screen. FIG. 2 illustrates a second view screen for the vehicle display of FIG. 1. This second view screen still includes the speedometer component 201 and the numeric scale indicator 203, but also includes a vehicle G-force indicator 205. The G-force indicator 205 includes a circular field positioned between a visual indication of the four wheels of the vehicle. The color of each wheel of the vehicle are changed when the vehicle is under the active influence of a compensatory vehicle control system such as, for example, ABS, ESP, or TCS systems. In the example, of FIG. 2, the front driver-side wheel is colored black indicating that its operation is not being directly modified by any vehicle compensation system. However, each of the remaining three wheels is colored yellow, thereby indicating that intervention is being applied.

The circular field is a radial grid for identifying g-force magnitudes and directions. The field includes a ball that moves around the radial grid to identify the real-time vector g-force being measured. A stationary faded ball is also displayed that marks the most recent maximum g-force measured. A vector indicator (showing both a magnitude and a direction) for the lateral acceleration (e.g., left-to-right) is shown on the right hand side of the radial grid. A vector indicator of the longitudinal acceleration (e.g., front-to-rear) is shown underneath the radial grid. A maximum vector indicator (again, both magnitude and direction) for the longitudinal and lateral acceleration is shown at the bottom of the g-force indicator component 205.

When operating, the real-time ball will move about the radial grid in response to longitudinal and lateral acceleration inputs. When the vector magnitude of a g-force signal is larger than a threshold value, the faded ball will appear on the radial grid to indicate the sensed acceleration. The vector components of this maximum will also be displayed on the Gmax.force indicator at the bottom. After a threshold amount of time, the maximum g-force components as well as the faded ball will reset and wait for another maximum value that is larger than the threshold value.

A display controller for this system (described in further detail below) reads a new longitudinal and lateral acceleration signals from the CAN bus (also described below) using a calibrated sampling rate. The controller combines these components vectorially to find the magnitude of the sensed acceleration and stores it in a memory. The controller retains in the memory a calibrated number of previous acceleration magnitude values. The calibrated number of previous magnitude values together with the calibrated sampling rate defines the real-time window of acceleration being observed. The saved array of g-force magnitudes is parsed to search for a maximum. The maximum can be identified by observing increasing values of g-force magnitude followed by decreasing values. If the number of increasing values and decreasing values satisfy a calibrated threshold, then a reliable maximum has been identified. When a reliable maximum is identified and if its magnitude is greater than a calibrated maximum threshold, the faded ball and the maximum g-force components on the display are updated. After a calibrated amount of time, if no new reliable maximum g-force values with thresholds greater than the calibrated threshold are observed the faded ball and the maximum g-force display components are both reset to zero. In this way, the display resets the maximum observed g-force and waits to update again once a new large g-force value is sensed.

Figure 3:
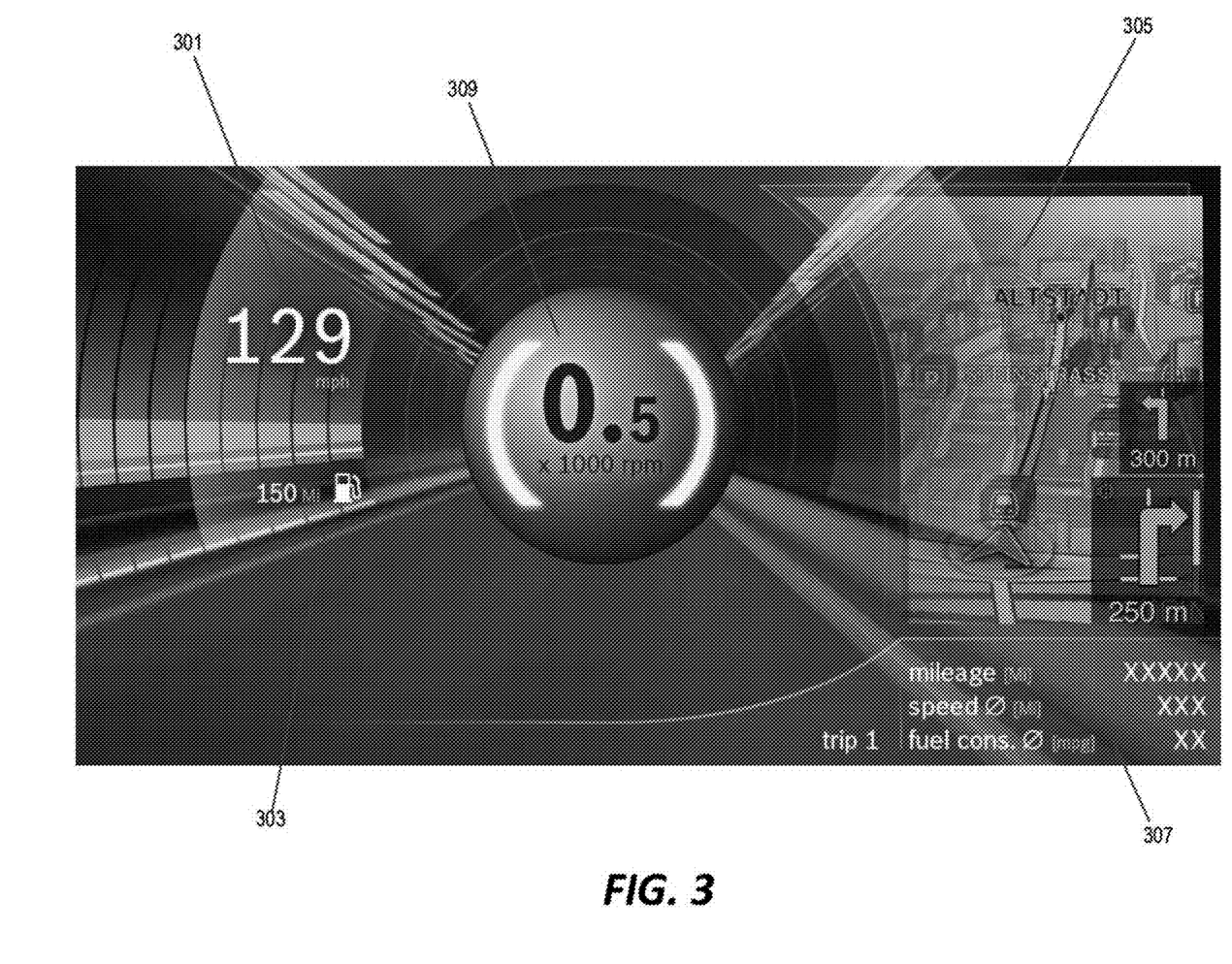
FIG. 3 is a front view of a vehicle display cluster according to another embodiment.

FIG. 3 illustrates another construction of a dynamic graphic display cluster. This display includes a textual indication of vehicle speed 301 and a fuel gauge 303. The fuel gauge in this example is configured to display the estimated fuel range of the vehicle based on observed fuel efficiency and the volume of fuel in the fuel tank of the vehicle. The display also shows a navigation system 305 and additional textual information 307 related to vehicle performance.

The display of FIG. 3 also includes a component for indicating vehicle performance in the form of a performance ball 309. The performance ball 309 in this example is presented as a two-dimensional illustration of a three-dimensional ball. The measured engine speed of the vehicle is displayed on the surface of the performance ball 309. As illustrated in further detail in FIGS. 4A-4F, the shape, size and color of the performance ball 309 changes based on measured vehicle performance values.

Figure 4A:
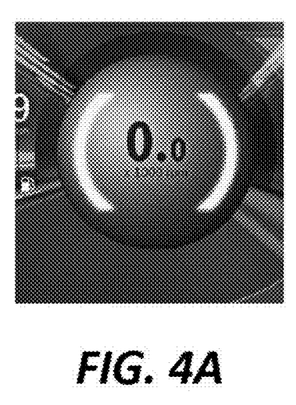
FIGS. 4A, 4B, 4C, 4D, 4E, and 4F are front views of an indicator component of the vehicle display cluster under a variety of different vehicle operating conditions.
Figure 4B:
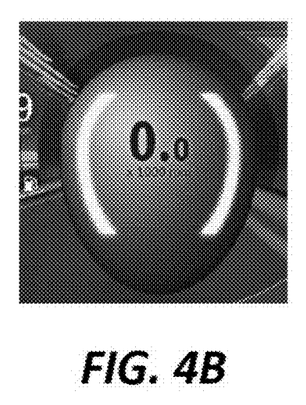
Figure 4C:
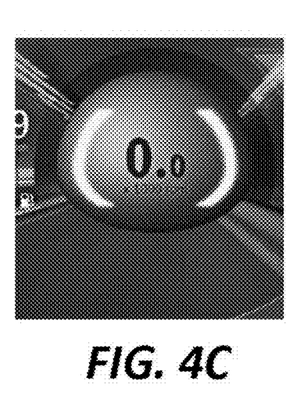
Figure 4D:
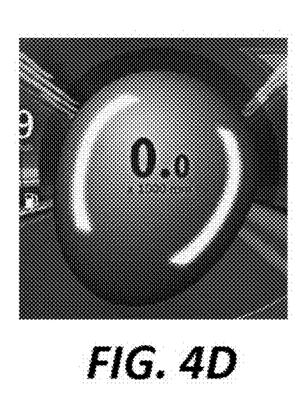

In FIG. 4A, the performance ball 309 is colored blue and shown as a perfectly spherical shape. As the engine speed (i.e., RPM) increased, the size of the performance ball is also increased. As the vehicle accelerates, the shape of the performance ball is stretched as shown in FIG. 4B. Conversely, as braking is applied and the vehicle decelerates, the shape of the performance ball is compressed as shown in FIG. 4C. To indicate lateral g-forces acting on the vehicle (e.g., as the vehicle turns), the performance ball is rotated on the display as illustrated in FIG. 4D.

Figure 4E:
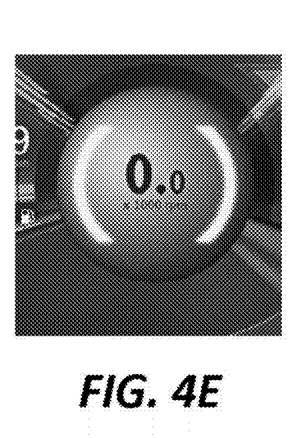
Figure 4F:
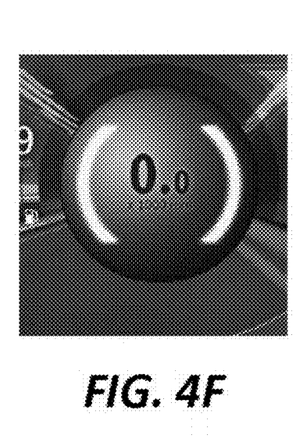

The performance ball 309 also indicates recommended shift points for a vehicle with a standard/manual transmission. When the performance ball is colored green (as shown in FIG. 4E), the display indicates that the vehicle is being operated in the optimal gear. However, when downshifting is recommended, the performance ball is colored blue (as shown in FIGS. 4A-4D). Lastly, when shifting to a higher gear is recommended, the display shows the performance ball colored red as in FIG. 4F.

Figure 5:
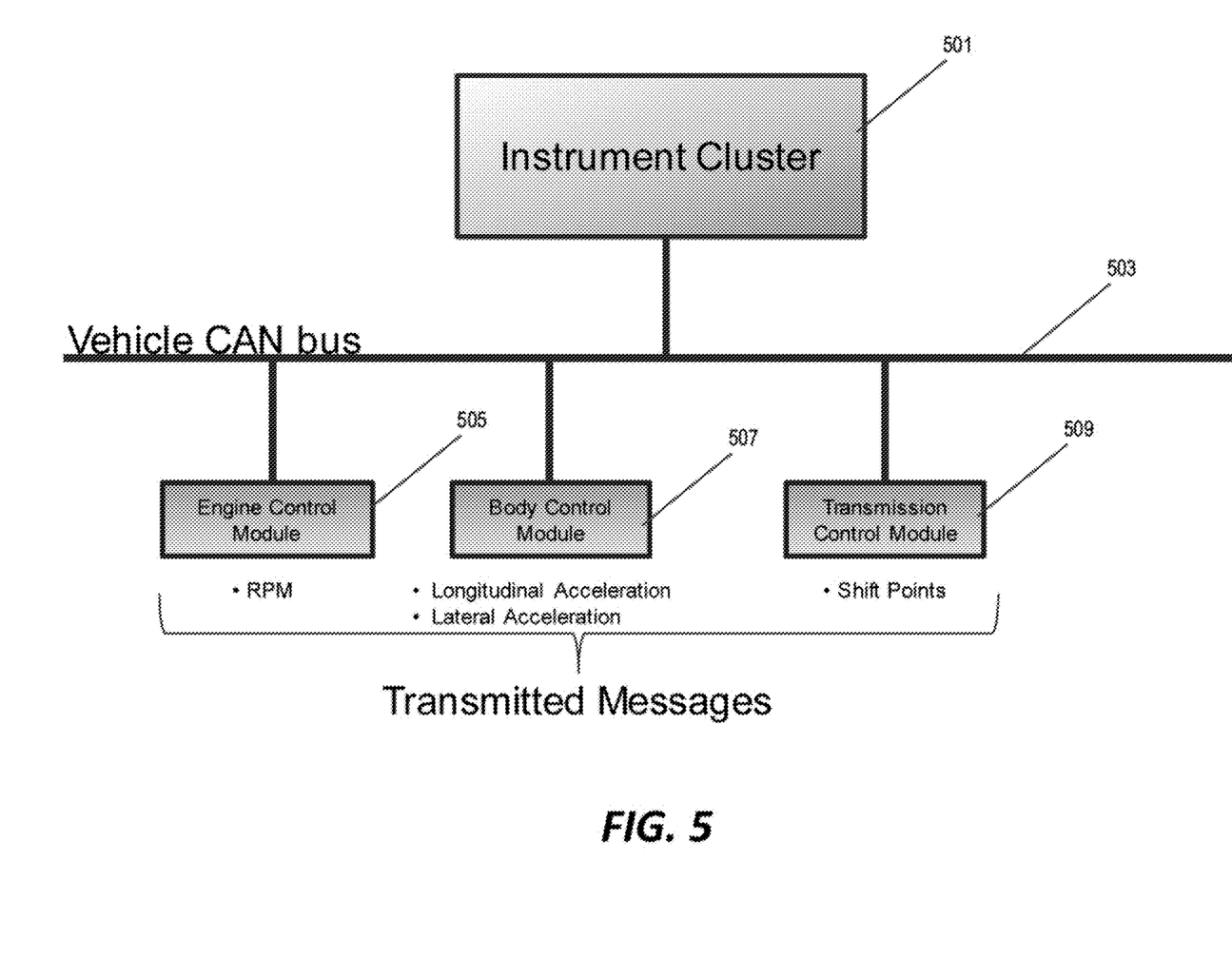
FIG. 5 is a schematic diagram of a system for controlling a vehicle display cluster.

FIG. 5 illustrates various hardware components that provide for the operation of the dynamic vehicle display clusters illustrated in FIGS. 1-4F above. The instrument cluster 501 is connected to a vehicle CAN ("controller area network") bus 503. Also connected to the bus 503 are an engine control module 505 that, among other things, determines the engine speed (i.e., RPM) of the vehicle. A body control module 507 communicates with a number of sensors, including lateral and longitudinal acceleration sensors, to determine various accelerations being experienced by the vehicle. Lastly, a transmission control module 509 monitors operation of the transmission system and communicates optimal transmission shift points to the CAN bus 503.

Figure 6:
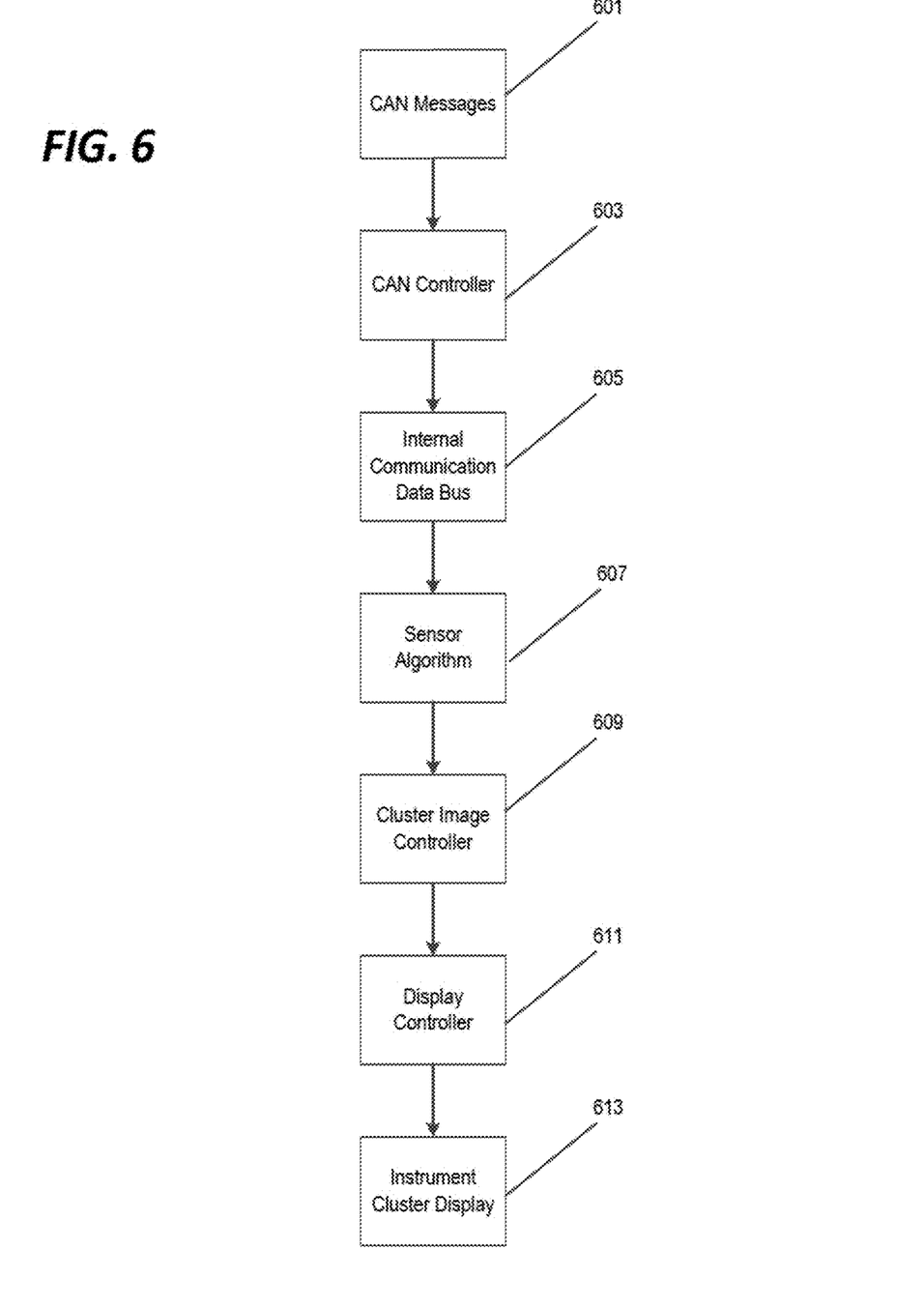
FIG. 6 is a functional flow-diagram illustrating the flow of information during operation of the system of FIG. 5.

FIG. 6 illustrates the steps performed by the instrument cluster system to translate messages from the other vehicle systems (received through the CAN bus) to information that is displayed on the cluster display. The method illustrated in FIG. 6 specifically describes the operation of the vehicle display of FIG. 3. However, similar actions and communications also provide for the operation of the vehicle display illustrated in FIGS. 1 and 2.

CAN messages are communicated by various connected components to the CAN bus (step 601). The CAN controller software component receives the CAN messages from the Can bus (step 603). Messages are buffered until retrieved from other software components. The internal communication data bus retrieves the Can messages from the Can controller and makes them available to other software components through a software bus such as D-BUS (step 605). The sensor algorithm software components retrieve the messages from the internal communication bus and process the CAN messages into a smooth output for the graphics subsystem (step 607). The sensor algorithms also determine the maximum and minimum levels to be sent to the graphics subsystem. The graphics subsystem (i.e., the cluster image controller) takes the smoothed sensor data and modifies the graphical images to be shown on the cluster display (step 609). Images are retrieved from internal memory and modified using an internal graphical framework to modify color, size, and shape of the images based on the sensor input. The display controller outputs the new graphical images retrieved from the graphical subsystem at the frame rate to which the display controller is able to display (step 611). Lastly, the updated images are shown on the image cluster display (step 613).

Thus, the invention provides, among other things, a dynamic vehicle display system for graphically illustrating vehicle performance characteristics, including, for example, real-time g-forces acting upon the vehicle. Various features and advantages of the invention are set forth in the following claims.

What is claimed is:

1. A graphical display unit for a vehicle, the graphical display unit including a screen and a controller configured to:
   receive a signal indicative of vehicle acceleration;
   determine a display angle for an axis of an elliptic icon based on a lateral acceleration of the vehicle;
   display the elliptic icon on the screen oriented on the axis at the determined display angle; and
   adjust a shape of the elliptic icon displayed on the screen based on the signal indicative of the vehicle acceleration,
   wherein the controller is configured to cause the shape of the elliptic icon displayed on the screen to appear substantially circular in response to a determination, based on the signal indicative of the vehicle acceleration, that the vehicle acceleration is approximately zero in a forward direction,
   wherein the controller is configured to cause the shape of the elliptic icon displayed on the screen to appear stretched in response to a determination, based on the signal indicative of the vehicle acceleration, that the vehicle acceleration is greater than zero in the forward direction, wherein the controller is configured to cause the shape of the elliptic icon to appear stretched by displaying a non-circular icon that is stretched along the axis at the determined display angle, and
   wherein the controller is configured to cause the shape of the elliptic icon displayed on the screen to appear compressed in response to a determination, based on the signal indicative of the vehicle acceleration, that the vehicle acceleration is less than zero in the forward direction, wherein the controller is configured to cause the shape of the elliptic icon to appear compressed by displaying a non-circular icon that is compressed along the axis at the determined display angle.

2. The graphical display unit of claim 1, wherein the controller is further configured to determine the display angle for the axis of the elliptic icon based on the lateral acceleration of the vehicle by
   determining a display angle that positions the axis of the elliptic icon vertically on the screen in response to a determination that the lateral acceleration of the vehicle is approximately zero; and
   determining a display angle that positions the axis of the elliptic icon at a defined angle relative to a vertical in response to a determination that the lateral acceleration is greater than or less than zero.

3. The graphical display unit of claim 2, wherein the controller is further configured to determine the defined angle of the axis relative to the vertical based on a magnitude and direction of the lateral acceleration of the vehicle.

4. The graphical display unit of claim 1, wherein the controller is further configured to adjust the shape of the elliptic icon by adjusting a diameter of the elliptic icon based on a current engine speed of the vehicle.

5. The graphical display unit of claim 1, wherein the controller is further configured to
   determine whether the vehicle is operating in a recommended gear, and
   modify the color of the elliptic icon when it is determined that the vehicle is operating in a gear other than the recommended gear.

6. The graphical display unit of claim 1, wherein the controller is configured to
   determine whether the vehicle is operating in a recommended gear in a manual transmission system,
   display a first color on the elliptic icon when it is determined that the vehicle is operating in the recommended gear,
   display a second color on the elliptic icon when it is determined that the vehicle is operating in a gear higher than the recommended gear, and
   display a third color on the elliptic icon when it is determined that the vehicle is operating in a gear lower than the recommended gear.

7. The graphical display unit of claim 6, wherein the first color is blue, the second color is green, and the third color is red.

8. The graphical display unit of claim 1, wherein the controller is further configured to display a numeric value indicative of engine speed on the elliptic icon.

9. A graphical display unit for a vehicle, the graphical display unit including a screen and a controller configured to:
   receive an acceleration signal indicative of a vehicle acceleration of the vehicle;
   receive an engine speed signal indicative of an engine speed of the vehicle;
   display an elliptic icon on the screen oriented on an axis;
   adjust a size of the elliptic icon displayed on the screen based on changes to the engine speed as indicated by the engine speed signal,
      wherein the controller is configured to adjust the size of the elliptic icon by increasing the size of the elliptic icon corresponding to an increase in the engine speed of the vehicle and by decreasing the size of the elliptic icon corresponding to a decrease in the engine speed of the vehicle; and
   adjust a shape of the elliptic icon displayed on the screen based on changes to the vehicle acceleration as indicated by the acceleration signal,
      wherein the controller is configured to cause the shape of the elliptic icon displayed on the screen to appear substantially circular in response to a determination, based on the acceleration signal, that the vehicle acceleration is approximately zero in a forward direction, wherein the controller is configured to cause the shape of the elliptic icon displayed on the screen to appear stretched in response to a determination, based on the acceleration signal, that the vehicle acceleration is greater than zero in the forward direction, wherein the controller is configured to cause the shape of the elliptic icon to appear stretched by displaying a non-circular icon that is stretched along the axis, and wherein the controller is configured to cause the shape of the elliptic icon displayed on the screen to appear compressed in response to a determination, based on the acceleration signal, that the vehicle acceleration is less than zero in the forward direction, wherein the controller is configured to cause the shape of the elliptic icon to appear compressed by displaying a non-circular icon that is compressed along the axis.

10. The graphical display unit of claim 9, wherein the controller is configured to display the elliptical icon as a substantially circular icon with a first diameter in response to determining that the vehicle acceleration is approximately zero in the forward direction and that the engine speed is a first engine speed; and display the elliptical icon as a substantially circular icon with a second diameter in response to determining that the vehicle acceleration is approximately zero in the forward direction and that the engine speed is a second engine speed, wherein the second engine speed is greater than the first engine speed and the second diameter is greater than the first diameter.

\* \* \* \* \*